ments being connected adjacent their lower ends to said load-carrying member; and a load-responsive device secured to said support member, said device having a first portion on which are mounted bonded wire resistance elements for sensing a load imposed upon said device and having a second portion disposed within said longitudinal bore to normally maintain said beam element in non-supported relation to the lower surface of said transverse opening whereby the load carried by said load-carrying member will be imposed upon said load-responsive device, said beam element being adapted, upon structural failure of said load-responsive device, to be supported by the lower surface of said transverse opening independently of said device.

5. A swivel bail adapter comprising: a shank member adapted for supporting encirclement by a well pipe elevator, said member having a transverse opening and a longitudinal bore formed therebelow and intersecting said opening; a swivel bail-supporting saddle member; a pair of spaced side plates connected adjacent their upper ends by a pin supported within said shank opening and connected adjacent their lower ends to said saddle member; and a load-responsive capsule detachably secured to the lower portion of said shank member, said capsule having a first portion upon which are mounted bonded wire resistance elements for sensing a load imposed upon said capsule and having a second portion disposed within said shank bore to normally maintain said pin in non-supported relation to the lower surface of said shank opening whereby the load suspended from said saddle member will be imposed upon said load-responsive capsule, said pin being adapted, upon structural failure of said capsule, to be supported by the lower surface of said shank opening independently of said capsule.

6. A swivel bail adapter comprising: a shank member adapted for supporting encirclement by an elevator; a saddle member adapted to sustain a swivel bail and being formed with a pair of lateral extensions; a pair of spaced side plates connected adjacent their upper ends to said shank member, each of said plates having a lateral opening formed adjacent its lower end adapted to receive one of said saddle extensions and having a longitudinal bore formed therebelow intersecting said lateral opening; and a pair of load-responsive capsules, each being secured to the lower portion of a respective side plate and having a first portion disposed within the respective bores in said side plates to normally maintain said saddle extensions spaced from the lower surfaces of the side plate openings whereby the load suspended from said saddle member is imposed upon said capsules, said capsules incorporating a second portion on which are mounted bonded wire resistance elements for sensing said load, said extensions being adapted, upon structural failure of said capsules, to engage the lower surfaces of said side plate openings and thereby transfer the load directly therebetween independently of said capsules.

7. Load supporting and sensing apparatus comprising: a support member having a transverse opening; a load-carrying member; a pair of spaced tension elements connected adjacent their upper ends to said support member by a beam element supported within said opening; and a load-responsive device interposed between said support member and said tension elements to normally maintain said beam element spaced from the lower surface of said transverse opening and thereby assume the load carried by said load-carrying member, said device mounting bonded wire resistance elements for sensing said load, said beam element being adapted, upon a structural failure of said load-responsive device, to engage the lower surface of said transverse opening so as to transfer said load directly therebetween independently of said device.

8. A swivel bail adapter comprising: a shank member adapted for supporting encirclement by an elevator, said shank member having a transverse opening; a swivel bail supporting-saddle member; a pair of spaced side plates connected adjacent their upper ends by a pin supported within said shank opening and connected adjacent their lower ends to said saddle member; and a load-sensitive tension link secured adjacent its upper end to said shank member and secured adjacent its lower end to said side plates so as to normally maintain said pin spaced from the lower surface of said shank opening whereby said load-sensitive tension link is subjected to strain proportional to the load suspended from said saddle member, said link mounting bonded wire resistance elements for sensing said load, and said pin being adapted, upon structural failure of said link, to engage the lower surface of said shank opening to thereby transfer said load directly therebetween independently of said link.

9. Load supporting and sensing apparatus comprising: a support member; a load-carrying member; an intermediate load-transferring member comprising a pair of spaced tension elements and a beam element, said tension elements being connected adjacent their upper ends to said support member by said beam element and being connected adjacent the lower ends to said load-carrying member; and a load sensitive device operatively interposed in load-sustaining relation between said load-transferring member and one of the other members, said load sensitive device having bonded wire resistance elements mounted on a portion thereof for sensing the load sustained by said device, said load transferring member and said one other member having complementary load-bearing surfaces normally maintained spaced apart by said load sensitive device whereby said device is subjected to strain proportional to a load carried by said load-carrying member, said load-bearing surfaces being adapted to interengage and transfer said load directly between said load-transferring member and said one other member in the event of structural failure of said load-sensitive device.

10. A swivel bail adapter comprising: a shank member adapted to be encircled and supported by a well pipe elevator; a swivel bail supporting member; an intermediate load-transferring member, said member being connected at its upper end to said shank member and at its lower end to said swivel bail supporting member; and a load-sensitive device operatively interposed in load-sustaining relation between said load-transferring member and one of the other members, said load-sensitive device having bonded wire resistance elements mounted on a portion thereof for sensing the load sustained by said device, said load-transferring member and said one other member having complementary load-bearing surfaces normally maintained spaced apart by said load-sensitive device whereby said device is subjected to strain proportional to a load supported by said swivel bail supporting member, said load- July 14, 1953 — L. B. SCOTT — 2,645,121
WEIGHT SENSING DEVICE
Filed April 29, 1949 — 4 Sheets-Sheet 1
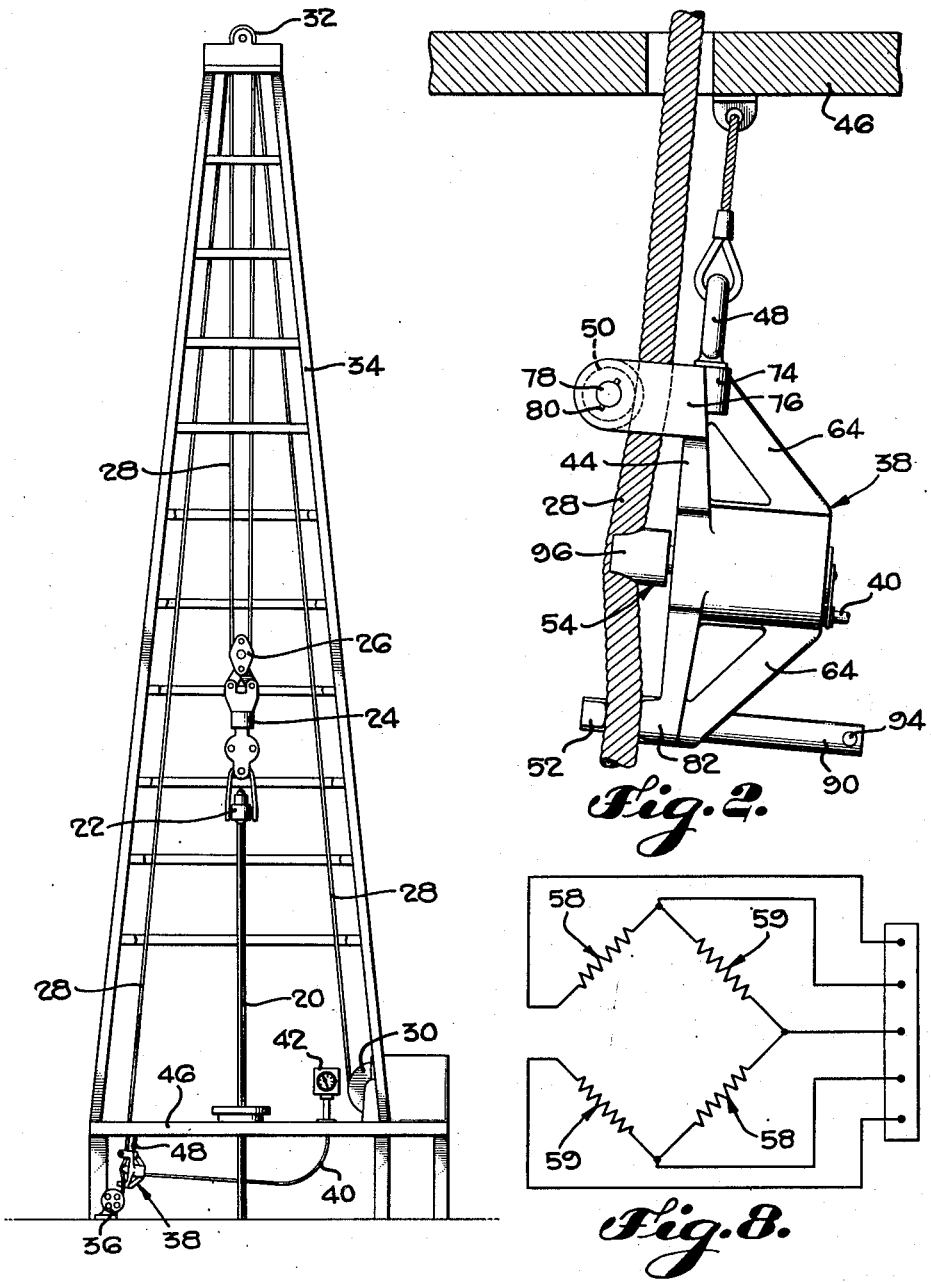
LYLE B. SCOTT, INVENTOR.
BY Lyon & Lyon
ATTORNEYS July 14, 1953 — L. B. SCOTT — 2,645,121
WEIGHT SENSING DEVICE
Filed April 29, 1949 — 4 Sheets-Sheet 2

LYLE B. SCOTT,
INVENTOR.

BY Lyon & Lyon
ATTORNEYS

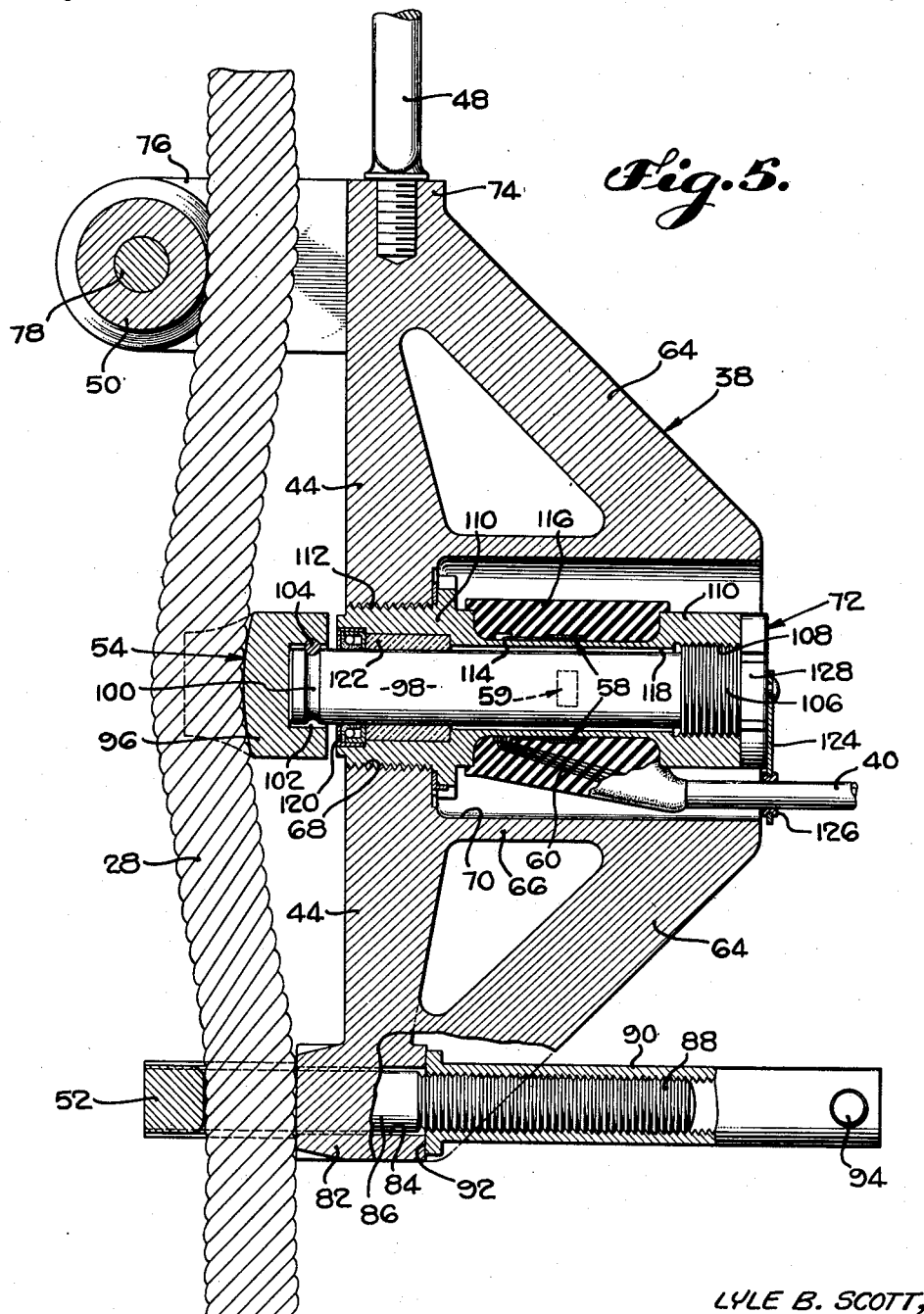

July 14, 1953  L. B. SCOTT  2,645,121
WEIGHT SENSING DEVICE
Filed April 29, 1949  4 Sheets-Sheet 4
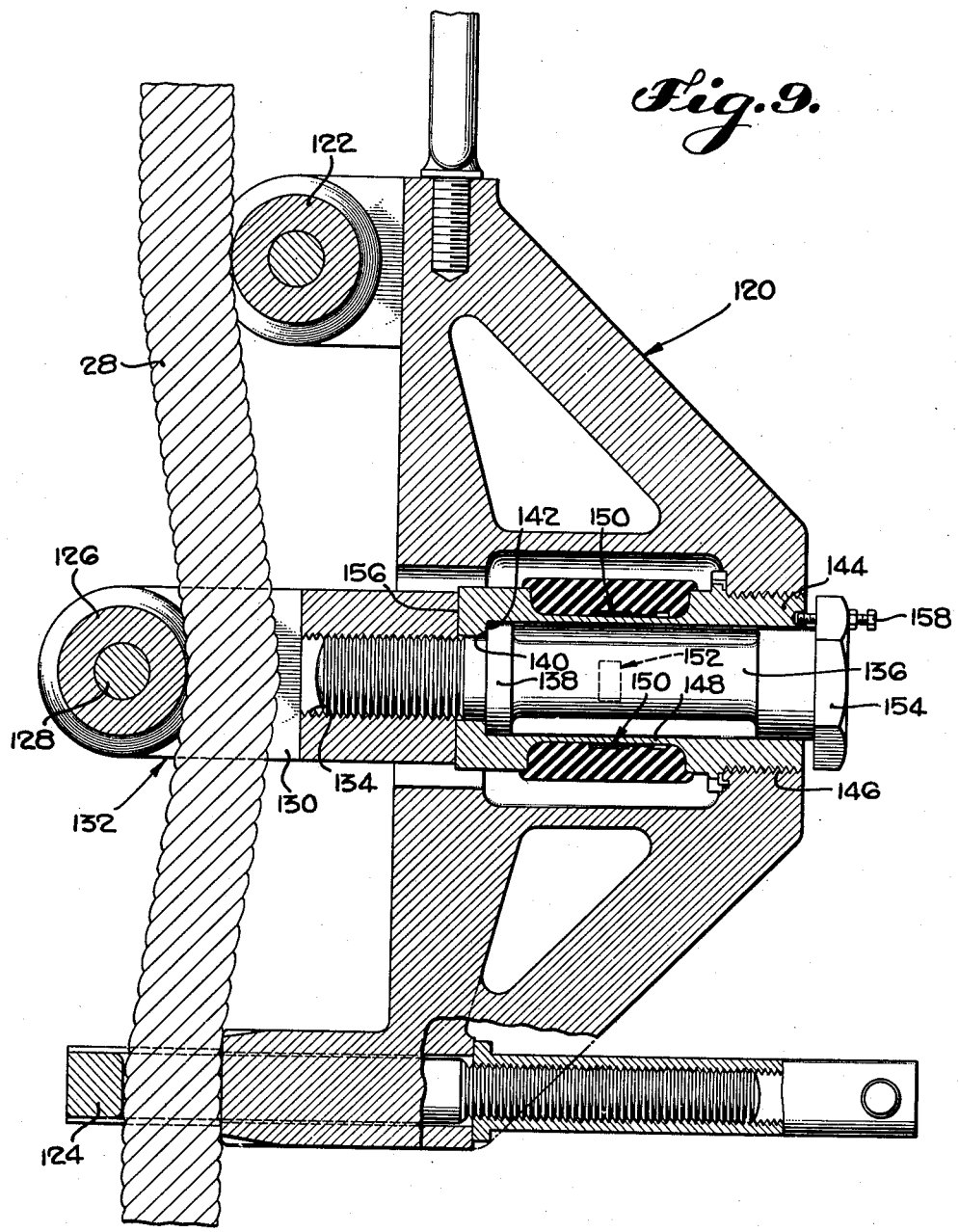
LYLE B. SCOTT,
INVENTOR.
BY Lyon & Lyon
ATTORNEYS

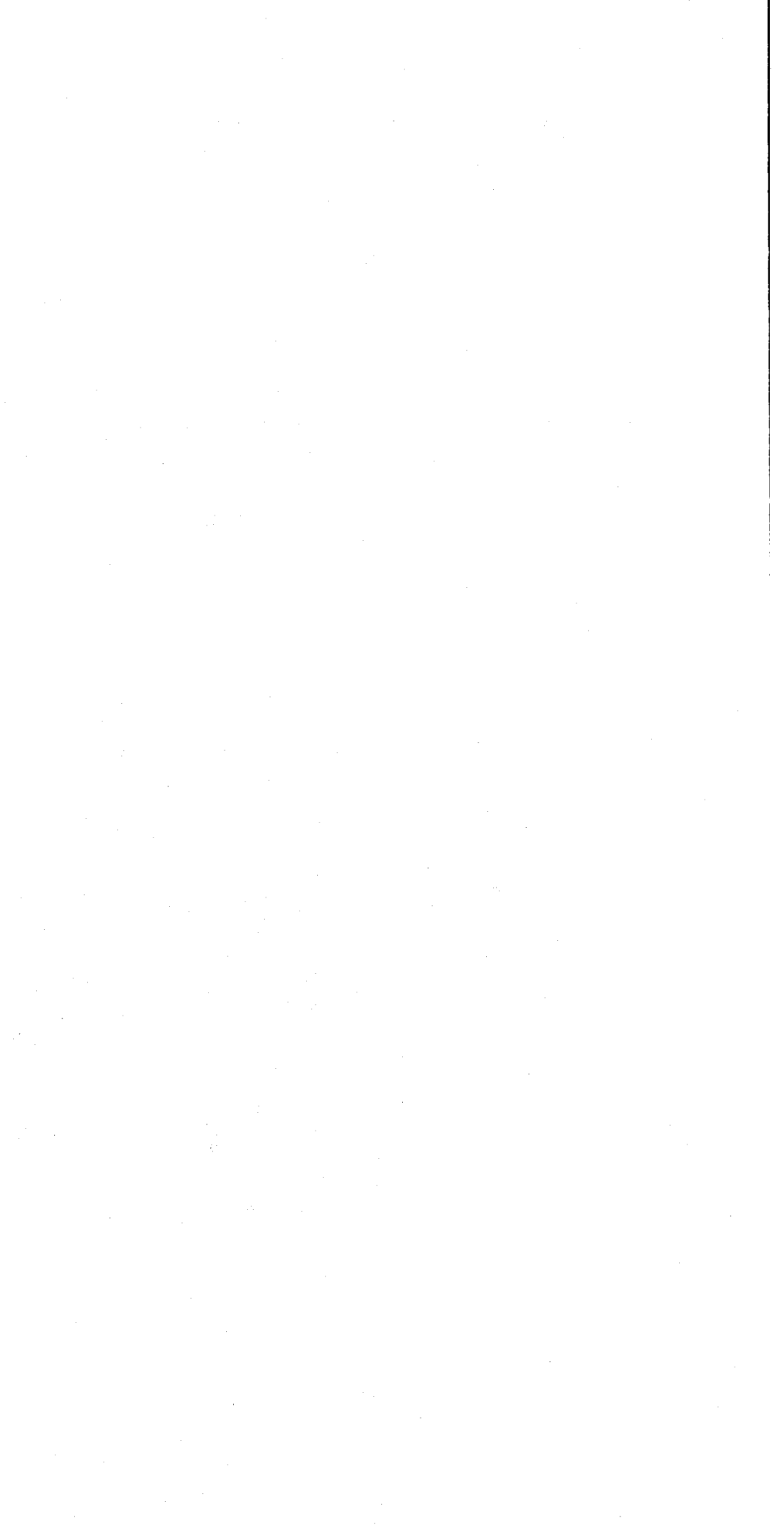

Patented July 14, 1953

2,645,121

UNITED STATES PATENT OFFICE 2,645,121

WEIGHT SENSING DEVICE

Lyle B. Scott, South Gate, Calif., assignor to Byron Jackson Co., Vernon, Calif., a corporation of Delaware Application April 29, 1949, Serial No. 90,414

13 Claims. (Cl. 73—144)

This invention relates generally to weight sensing devices, and particularly to an improved weight sensing device for use in the drilling of oil wells.

In the drilling of an oil well, it frequently becomes necessary that the operator be informed as to weights, line tensions, and the like. For example, where drilling with rotary equipment wherein a heavy drill string is used to suspend the drill bit; in order to insure the efficient cutting of the formation, in order to avoid damage to the drilling apparatus, and in order to minimize the possibility of a crooked hole, it is desirable that the pressure of the drill bit against the formation be closely regulated. Since the weight of the entire drill string imparts a pressure greater than can be used advantageously or even safely under usual conditions, part of the weight of the said drill string must be suspended, and it is desirable to know just what part of said weight is suspended in order to determine the pressure on the drill bit.

The drill string is suspended from a drilling cable, and there have heretobefore been provided weight indicators which provide a reading as to the weight being suspended. The most common type of such a weight indicator operates on the principle of misaligning a portion of the stationary end of the drilling cable or dead line so that the load tends to straighten out the misaligned portion. This tendency to straighten out the cable is used to transmit a force to the weight indicating device which converts the force into sensible indications by hydraulic or mechanical means connected within the weight indicator device itself. Such indications appear upon an indicator dial attached directly to the body of the device or appear upon a dial adjacent the driller's position.

In the hydraulic type weight indicator previously mentioned there is usually provided a closed fluid system within which a diaphragm is so flexed by the force of the deflected drilling cable as to impose a pressure upon the fluid which varies directly as such force. The pressure upon the fluid is converted into a sensible indication by a pressure gauge calibrated in weight units. The mechanical type of weight indicator ordinarily comprises a spring or beam which is flexed by the force of the deflected drilling cable to operate a linkage system connected to an indicating dial.

The difficulties which have been found to exist in the foregoing type of instruments are generally those of low sensitivity, excessive time lag between a change in force and its sensible indication upon the dial, and the fact that the deadline is subject to an appreciable vibration and the instrument is therefore often difficult to read, particularly when the deadline is located at some distance from the position of the driller. Further, the hydraulic type previously described lacks in accuracy due to temperature changes and leakage, and it is frequently necessary to interrupt drilling operations in order to perform readjustments to avoid the said inaccuracies. As to the mechanical type indicator, particularly serious inaccuracies arise from the vibration of the deadline, in large part due to the frequent positioning of the indicator dial on the instrument itself.

Further, it is inherent in the nature of the mechanical type weight indicator that a low order of sensitivity is present and that time lag therein is excessive.

In the present invention it is proposed to provide a weight indicator neither dependent upon mechanical linkage nor upon fluid pressures. Such a device is made possible in view of the invention disclosed in Patent No. 2,292,549, entitled Material Testing Apparatus, issued August 11, 1942, to E. E. Simmons, Jr., which consists in a means for measuring forces and weights comprising bonded wire resistance strain gauges. Such means makes use of the fact that the resistance of a conductor will vary as a function of a strain-imparting force applied to the conductor.

However, the difficulties attendant upon application of the aforesaid invention to the oil well weight indicating art are manifest. For example, since the sensible accuracy of devices of this kind depends upon variation in resistance responsive to strain, it is obvious that the strain gauges should be bonded to a load responsive member to which considerable strain is imparted as the result of a given force. Such load responsive member must therefore be of small cross-section but on the other hand such load responsive member, being of small cross-section, must not be in a position whereby the possibility of failure in the member might decrease the safety factors necessary to the entire drilling operation.

Again, since the accuracy of such type device is dependent upon the transmission of a uniform strain to the bonded conductors, the organization of any weight sensing device embodying these strain gauges must be such that any straining of the conductors therein is in fact uniform. Moreover, the nature of the strain gauge itself requires that it be protected, that it be not subject to blows, moisture, or the deleterious effects of the corrosive substances frequently found in proximity to oil well operations.

It is therefore the principal object of this invention to provide a novel means for accurately measuring and instantaneously indicating weights, forces and the like in the oil well drilling art.

Another principal object of this invention is to provide a weight sensing device including bonded wire resistance strain gauges.

A further object is to provide such a weight sensing device wherein the safety of the drilling operation is not adversely affected by the presence of such bonded wire resistance strain gauges.

And yet another object is to provide a weight sensing device embodying bonded wire resistance strain gauges wherein the conductors of such strain gauges are invariably subjected to uniform strain.

And it is a general object of this invention to provide a new load measuring device of the type operable from a misaligned portion of a flexible element such as a drilling cable, the accuracy of which is not adversely affected by temperature variations or by vibration, the sensible indications of which may be read on a dial remote from the device itself and easily accessible to the driller and which is substantially free of any lag whatsoever between the time of receiving a force change and the time of sensibly indicating such force change on the dial.

Further objects of the invention will appear hereinafter.

In the drawings:

Figure 1 is a schematic view in side elevation of a derrick in which a weight sensing device built in accordance with this invention has been installed;

Figure 2 is a side elevational view of said weight sensing device;

Figure 5 is an enlarged longitudinal sectional view of the weight sensing device;

Figure 8 is a wiring diagram showing the manner in which the bonded wire resistance strain gauges are electrically connected; and Figure 9 is a view similar to Figure 5 but showing a modification thereof.

Figure 3:
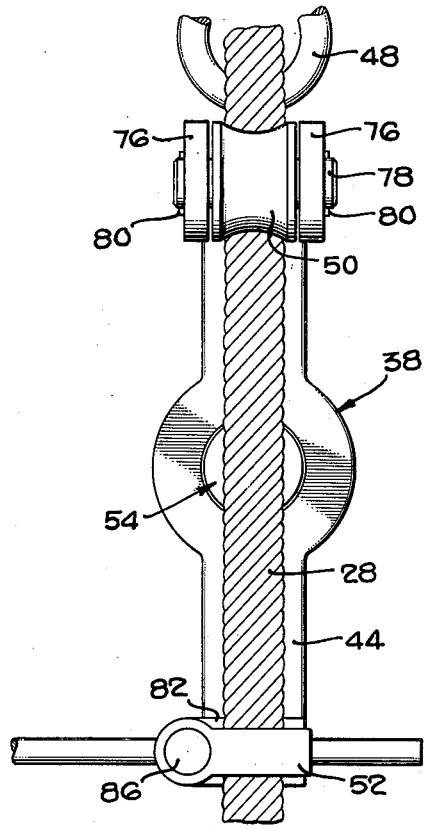
Figure 3 is a front elevational view thereof.
Figure 4:
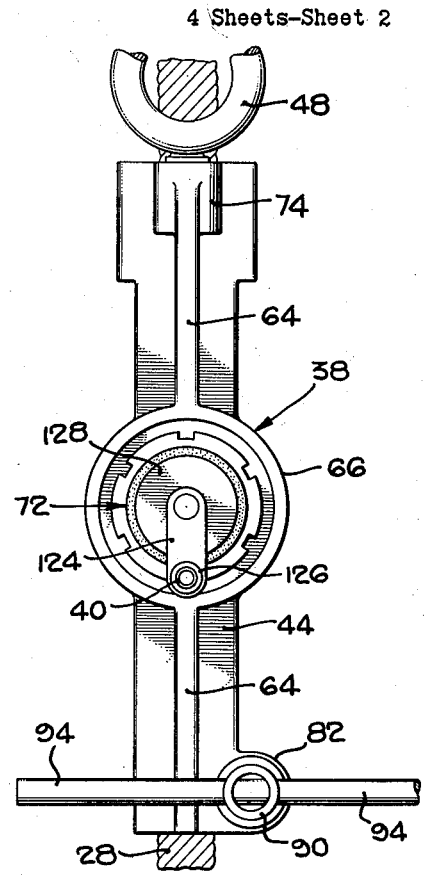
Figure 4 is a rear elevational view of said device.

Referring to the drawings, Figure 1 shows a conventional oil well drilling apparatus wherein a drill string 20 carrying a drill bit (not shown) is supported by a rotary swivel 22 which is in turn carried by a connector 24 supported by a traveling block 26. Drilling cable 28 passes from a draw works 30 over a crown block 32 in the top of the derrick 34 through sheaves in the traveling block 26 back over the said crown block 32 and to an anchor 36. The portion of the drilling cable 28 extending from the crown block 32 to the anchor 36 is known as the deadline and it is to this portion of the drilling cable that the weight sensing device 38 embodying one form of the instant invention is connected, preferably at a point adjacent to the anchor 36. A conductor cable 40 leads from the weight sensing device 38 to a dial instrument 42 located near the driller's position wherein the output of the device is indicated and wherein such output may be recorded.

Referring to Figures 2 through 5 inclusive, and particularly to Figure 5, a weight sensing device constituting one embodiment of this invention broadly comprises a frame 44 suspended from the derrick floor 46 by an eye 48, a connecting roller 50, a clamp 52, and a load transmitting member or plunger 54 abutting the cable 28 and operatively connected to the bonded wire resistance sensing elements 58 and 59 which are mounted on a load-responsive structure which, in the embodiment shown, is in the form of a cylindrical sleeve 110. Conductor wires 60 are connected to the elements 58 and 59 and lead through the conduit 40 to the dial instrument 42. By virtue of this device, upon the application of a load to the drilling cable 28, such cable tends to straighten and applies a linear compressive force to the load-transmitting member or plunger 54, which force subjects the load-responsive member 110 to tensile strain, producing a corresponding strain in the elements 58 and 59, varying the resistance thereof, the said load being read on the dial instrument 42. It will thus be seen that the assembly embodying this invention is not interposed in the path of the load being supported by the drilling cable 28 and that no failure thereof could affect the effective support of the load by the said cable 28.

In the particular construction of device shown in Figures 2 to 5 inclusive, the frame 44 is provided with webbing 64 and supports a main body 66. Said main body 66 is provided with a threaded bore 68 and counterbore 70 to receive the strain gauge assembly which will hereinafter be described and which is generally indicated as 72. At the upper extremity of the frame the eye 48 is threadedly received in a boss 74 and there extends from said frame 44 a bifurcated extension 76 which carries rotatably a pin 78 upon which the cable engaging roller 50 rotates. Cotterpins 80 may be used to hold the pin 78 in place.

At the other extremity of the frame 44 there is provided an extended boss 82 having a bore 84 through which extends a pin 86 carrying the clamp 52. Such pin 86 is provided with a threaded extremity 88 onto which is threaded a sleeve 90 carrying a shoulder 92 and having a handle 94. Thus when the handle 94 is turned, the sleeve 90, whose shoulder 92 abuts the boss 82, moves the pin 86 to draw the clamp 52 against the cable 28.

The plunger 54, as shown in Figure 5, comprises a saddle 96 abutting the deflected portion of the cable 28, and also includes a shank 98. The shank 98 is a portion of the strain gauge assembly 72 and has a grooved extremity 100 inserted in a socket 102 in the saddle 96 and held therein by the transverse pin 104. It has another extremity 106 which is threaded into the bore 108 of a cylindrical sleeve 110. The sleeve is provided with a threaded extremity 112 threaded into the threaded bore 68 of the main body 66. It further is provided with a reduced shank portion 114 upon which are mounted the bonded wire resistance elements 58 and 59.

Figure 6:
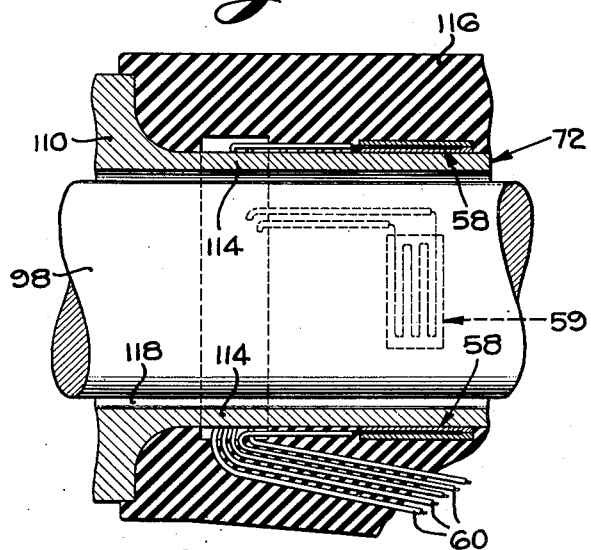
Figure 6 is an enlarged partial view of such device partly in section.
Figure 7:
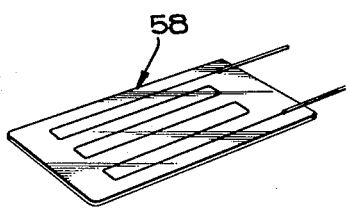
Figure 7 is a perspective view of one of the bonded wire resistance strain gauges.

The electrical circuit of the strain gauges assembly is shown in Figure 8 and is in the form of a Wheatstone bridge. Elements 58, as best shown in Figure 6, are bonded 180° apart on the circumference of reduced shank 114 of the sleeve 110 with their filaments parallel to the axis of the plunger shank 98. On the other hand, elements 59 are bonded to said reduced shank 114 180° apart but in a circumferential path with their filaments perpendicular to those of the elements 58. Hence when a load is applied to the drilling cable 28, a compressive force is applied to the plunger 54. Such force, by virtue of the connection of the shank 98 with the sleeve 110 and of the sleeve 110 with the main body 66, is converted to tension in the said sleeve 110 and a tensile strain is imparted to the reduced shank portion 114 of said sleeve. This strain results in a lengthening of the filaments in the elements 58 and a consequent increase in their resistance. Correspondingly, it results in a shortening of the filaments in the elements 59 due to necking of the reduced shank 114 and a consequent lowered resistance. As the elements 58 and 59 are on opposite legs of the Wheatstone bridge, the respective increases and decreases in resisetance are cumulative and a sensible indication of such resistance change appears on the dial of the indicator instrument 42. Such indicator dial 42 is of course calibrated in terms of weight and may be of the well known type embodying means for electronically amplifying the current flowing in the potentiometer branch of the Wheatstone bridge to energize a null balance motor connected to the dial pointer.

It will of course be apparent that it would be possible to directly bond the respective elements 58 and 59 to the shank 98 of the plunger 54. However, it will be noted that such shank is always in compression and it has been found that it is exceedingly difficult to impart a uniform strain to a member under compression and hence a uniform strain to elements bonded to such member. I have, however, discovered that the elements need not be bonded directly to such a member under compression, but that such compression can be converted to tension by the addition of a tensioned member in proper combination and the elements bonded directly to such tensioned member. Such expedient has been found not only to result in a transfer of a uniform strain to the respective elements, but also enables the use of an element carrying member of even less cross-section than would be otherwise necessary. This is because the compression problem of buckling is not present in a member under tension and results in a more strain-responsive assembly and consequently a more sensitive indicator.

In order to protect the respective elements from oil, water, and mechanical damage, a protective layer of rubber 116 is bonded to the reduced shank 114. In order to assure free relative movement between the shank 98 of the plunger 54 and the reduced shank 114 of the sleeve 110, the annular space 118 therebetween is filled with oil, grease or other lubricating substance. An oil seal 120 and retainer bushing 122 are provided to seal said oil within such annular space and to exclude moisture and the like from such space. Finally, a hanger 124 which supports a rubber grommet 126 is supported by the head 128 of the sleeve 110. Such grommet carries the conduit 62 leading to the indicator dial 42.

In the installation and operation of the above-described embodiment of the invention it is only necessary to remove one of the cotterpins 80, slide the pin 78 transversely so that the roller 50 may be removed and place the drilling cable 28 between the bifurcated ends 76, at the same time laying said cable over the saddle 96 of the plunger 54 and placing it between the clamp 52 and the boss 82. The roller may then be replaced and the handle 94 turned in the proper direction to clamp the said cable 28. Loading of the drilling cable 28 will result in an application of a force to the plunger 54. Such force is compressive but is transferred to the sleeve 110. A tensile strain is produced in the reduced portion 114 of said sleeve and is imparted to the filaments of the respective elements. Such strain results in resistance variation in the strain gauge assembly and such resistance variation appears on the dial of the indicator instrument 42 in terms of weight units.

It will be noted that the weight sensing device hereinabove described has no effect whatsoever on the safety factor present in the drilling rig itself, no member of the said device carrying any part of a suspended load. It will be further noted that no strain gauge measurement arises as the result of compression of a member carrying the device. Thus the strain in all elements is proportional to the force exerted as the result of the deflection of the cable 28 and is proportional to the load suspended from the cable 28.

In Figure 9 there is shown a slightly modified form of the invention, incorporating all of the advantageous features of the previously described embodiment. Whereas in the previously described embodiment the cable or other flexible element 28 is biased away from the frame 44 and therefore subjects the plunger 54 to a compressive force, in the instant embodiment the flexible element 28 is biased toward the frame 120. The frame is provided at its upper extremity with a roller 122 which engages the cable 28, and is provided at its lower extremity with a clamp 124 which may be similar in all respects to the clamp 52 of the previously described embodiment. Intermediate the roller 122 and the clamp 124 the cable is engaged by a roller 126 mounted on a pin 128 extending through aligned bores in the bifurcations 130 of a clevis 132. The clevis is provided with a threaded bore 134 which is engaged by the threaded extremity of a shank 136. A flange 138 formed on the shank 136 intermediate its ends provides a shoulder 140 which engages an opposed internal shoulder 142 on the cylindrical sleeve 144. The sleeve 144 is externally threaded at one end as indicated at 146 for securing it to the frame 120, it being noted that the internal shoulder 142 is formed on the sleeve at the end thereof remote from the threaded connection. The sleeve 144 is provided with an intermediate section 148 of reduced cross-sectional area, on which is mounted the elements 150 and 152 in the same manner as described hereinabove. It will be understood that the elements are connected in a Wheatstone bridge circuit which is connected by suitably sheathed conductor wires to an indicator instrument.

It will be observed that the shank 136 extends through the hollow interior of the sleeve 144 and is provided at its outer end with a wrench head 154 by which the shank may be rotated to thread it into the bore 134 in the clevis 132. The interengagement at 156 of the adjacent ends and of the clevis 132 and the sleeve 144 provides a positive predetermined amount of flexing of the cable 28 and thus assures a constant ratio between the tension in the cable and the lateral force exerted on the clevis 132 by the deflected portion of the cable. A lock screw 158 may be provided if desired, to lock the shank 136 against rotation relative to the sleeve 144.

To assemble and install this embodiment of